United States Patent [19]

Doan et al.

[11] Patent Number: 5,020,342
[45] Date of Patent: Jun. 4, 1991

[54] SAFETY LOCK

[75] Inventors: Frank W. Doan, Fort Erie; Robert L. Weckman, Whitby, both of Canada

[73] Assignee: 529900 Ontario Ltd., Fort Erie, Canada

[21] Appl. No.: 416,800

[22] Filed: Oct. 3, 1989

[51] Int. Cl.⁵ ............................................. E05B 73/00
[52] U.S. Cl. ........................................ 70/14; 24/601.7; 70/DIG. 63; 292/307 R; 292/329
[58] Field of Search .................. 70/14, DIG. 63, 238, 70/226; 24/241 SL, 236, 601.7; 292/320, 307 A, 307 B, 307 R, 88, 104, 328-330, 148, 205

[56] References Cited

U.S. PATENT DOCUMENTS

| | | | |
|---|---|---|---|
| 322,830 | 7/1885 | Kirby | 292/329 |
| 943,834 | 12/1909 | Lashbough | 292/307 R |
| 994,143 | 6/1911 | Fossati | 292/148 X |
| 2,240,162 | 4/1941 | Nemec | 70/DIG. 63 |
| 2,469,592 | 5/1949 | Byer | 292/307 R |
| 3,667,259 | 6/1972 | Reque et al. | 70/14 |
| 4,422,315 | 12/1983 | Klose | 70/456 R |

FOREIGN PATENT DOCUMENTS 2653260 12/1977 Fed. Rep. of Germany ...... 292/320
2138068 10/1984 United Kingdom ................ 292/205

Primary Examiner—Lloyd A. Gall
Attorney, Agent, or Firm—Rogers & Scott

[57] ABSTRACT

A device for use with multiple individual locks has a sleeve element and a core element which are movable relative to one another linearly between the release position and an engagement position, and a ball is provided having first and second ends with the first end attached to one of the sleeve and core elements, and the second end free for engagement with the device in the release position and for subsequent locking in place when the device is moved into the engagement position.

3 Claims, 1 Drawing Sheet

SAFETY LOCK

This invention relates to devices used with multiple individual padlocks to restrict access to controlled devices and areas.

BACKGROUND OF THE INVENTION

It is sometimes necessary and desirable to lock equipment such as heavy electrical switch gear, machine valving, etc. in such a way that access is provided only when several people are present. This is achieved by giving each person a padlock and key which is different from those given to the other persons so that to gain access, everyone must be present to remove the padlocks. Structures which achieve this are taught in U.S. Pat. Nos. 2,560,624 and 3,667,259. The structures in these patents are similar in that they both operate using a scissor arrangement. Two parts are pivoted to one another and when they are in an open position, the device can be applied to a staple associated with a hasp, then closed, and the device is ready to receive padlocks.

There are several disadvantages to the structures shown in these prior art patents. First of all, the strength is entirely dependent on the pin used to pivot the parts to one another. Secondly, because the parts are simply overlapped one over another, it is not difficult to deform the parts and gain unauthorized access. Some attempt has been made in Patent 3,667,259 to overcome this problem by the inclusion of interlocking tabs but nevertheless the difficulty remains.

It is therefore an object of the present invention to overcome the limitations of the prior art devices and to provide an improved device for use in restricting access using a plurality of padlocks.

SUMMARY OF THE INVENTION

Accordingly the invention provides a device having a sleeve element and a core element. The sleeve and core elements are movable relative to one another lineally between a release position and an engagement position and a bail is provided having first and second ends. The bail is attached at a first of its ends to one of the sleeve and core elements and the second end can be engaged with the device in the release position for subsequent locking in place when the device is moved into the engagement position.

BRIEF DESCRIPTION OF THE DRAWINGS

The invention will be better understood with reference to the following description and drawings, in which.

DESCRIPTION OF THE PREFERRED EMBODIMENT

Figure 1:
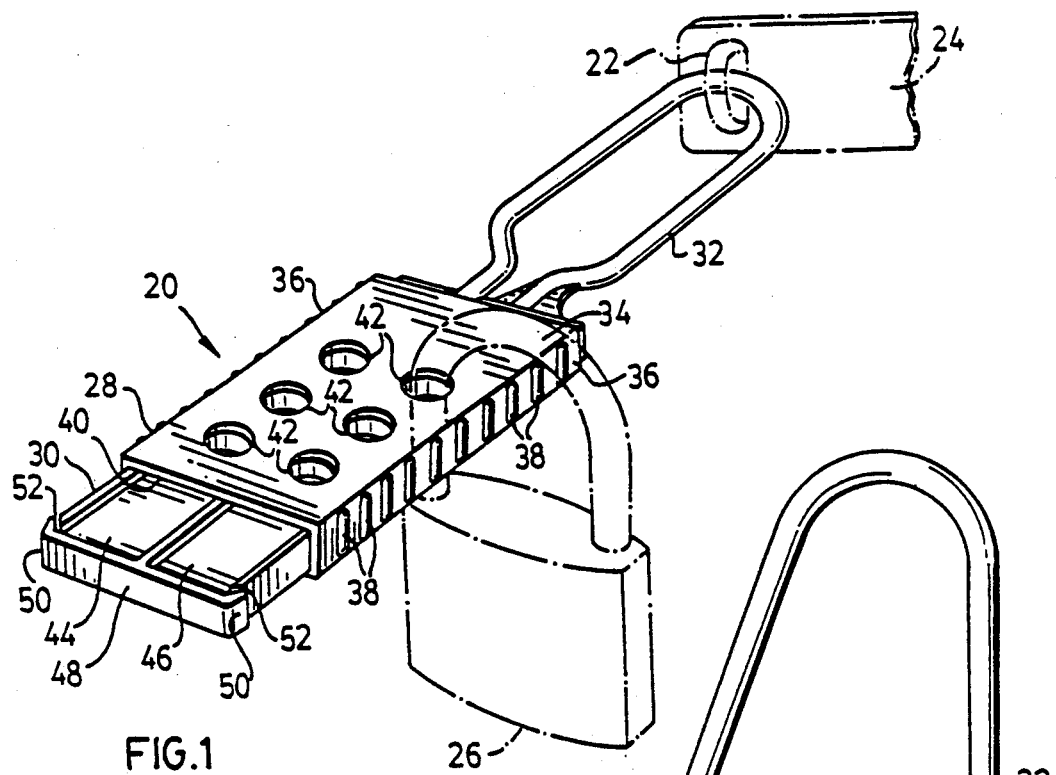
FIG. 1 is a perspective view of a device in an engagement position according to the invention and including parts shown in ghost outline to demonstrate the use of the device.

Reference is made firstly to FIG. 1 which shows a device according to a preferred embodiment of the invention and indicated generally by the numeral 20. In ghost outline, it is shown how the device would be attached to a staple 22 associated with a hasp 24 and one of as many as six locks 26. With the lock in position, the device can not be removed from the staple, and of course if there are six locks with six different keys, then it will require six people to be present to gain access by releasing the hasp 24 from the staple 22.

Figure 2:
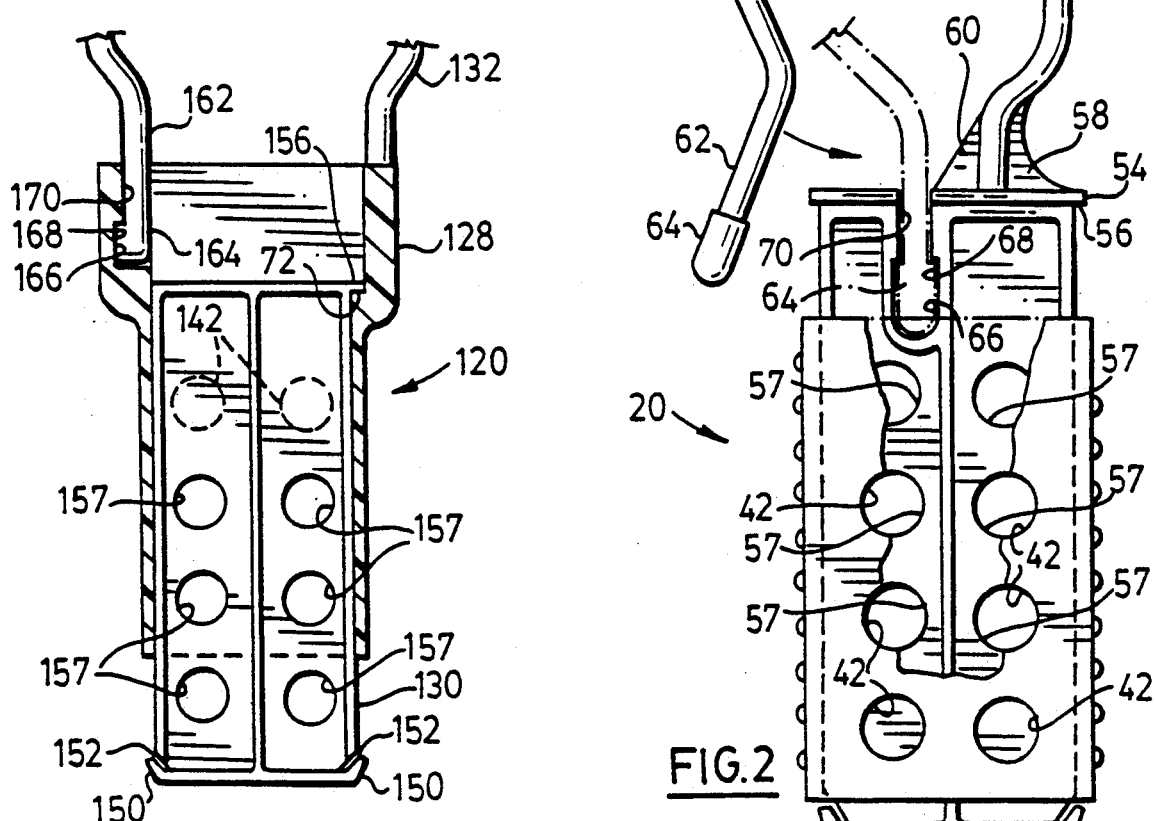
FIG. 2 is a side view of the device in a release position with a bail in an open position ready for use, and showing in ghost outline the position of the bail during the process of closing the device.

As seen in FIGS. 1 and 2, the device consists essentially of a sleeve element 28 containing a core element 30 to which a bail 32 is attached. The sleeve 28 has a pair of major sides 34 (one of which is seen) which combine with minor sides 36 to define a rectangular opening 40 extending through the sleeve element 28. Ribs 38 are provided on the minor sides 36 for better gripping the sleeve element in use and through openings 42 are defined in both of the major sides 34. These openings 42 are in alignment with corresponding openings in the other major side 34 and are of sufficient size to readily receive a padlock such as padlock 26.

The core element 30 has a cross-section shaped for slidable engagement in the opening 40 of the sleeve element 28. The cross-section is relieved by depressions 44, 46 to lighten the moulded structure and to minimize the use of material. Similar depressions are provided on the hidden side as drawn in FIGS. 1 and 2.

The core element includes a leading end 48 which is associated with a pair of side barbs 50 defined in part by slots 52 which give the barbs an element of flexibility. The barbs effectively make the cross-section of the core element oversized with respect to the rectangular opening 40 in the sleeve element so that when the core element is engaged in the sleeve element, starting with the leading end 48, the barbs are deflected inwardly sufficiently to permit sliding the core element through the sleeve element. On leaving the opening 40, the barbs take up the position shown in FIGS. 1 and 2 so that the core element can then not be separated from the sleeve element without first deflecting the barbs inwardly. In normal use, there will be no need to separate the parts.

The other end from the leading end 48 is an attachment end 54 defined by a low profile peripheral lip 56 which creates a cross-section greater than that of the aperture 40 in the sleeve element. Consequently the core element can not be moved beyond the position shown in FIG. 1 where the lip 56 is in engagement with an end of the sleeve element.

As a result of the combination of the barbs 50 and the lip 56, the core element 30 is limited to slide between an engagement position shown in FIG. 1 where it can receive padlocks 26 in through openings 42 of the sleeve element and corresponding aligned openings 57 in the core element, and a release position shown in FIG. 2. This latter position can be achieved only after the padlocks are removed thereby making it possible to disconnect the device from the staple 22 (FIG. 1) by manipulating the bail 32.

As better seen in FIG. 2, the bail is integrally attached to the core element 30 at the attachment end 54 and includes a pair of rib structures 58, 60 to rigidify the attachment. The bail extends from a fixed first end associated with the ribs 58, 60 to a releasable second end 62. At this later end there is an enlargement 64 shaped to fit in a slotted recess 66 which passes through the core element with constant cross-section between the major surface seen in FIG. 2 and the corresponding surface on the other side of the core element. Consequently it is possible to position the enlargement over the recess 66 and push it into the position shown in ghost outline in FIG. 2. Because the slotted recess 66 has an enlarged inner portion 68 and a neck portion 70, once the second end 62 of the bail is positioned in the recess 66, it is then possible to lock the bail in this position by simply sliding the sleeve element 28 relative to the core element 30 into the engagement position shown in FIG. 1. Consequently once the padlocks 26 are added, the bail can not be removed from the core element so that the device is then in a position where it can restrict access by retaining the staple 22 in the hasp 24 (FIG. 1).

In use, the device would normally be used with a plurality of padlocks and when the persons responsible for these padlocks are all present, the bail would be engaged in the staple 22 with device 20 in the release position and then, after engaging the second end 62 of the bail in the recess 66, the sleeve would be moved into the engagement position. Each of the persons responsible for access would then engage a padlock through one of the openings 42 and aligned openings 57 in the core element. The staple is now secure in the hasp until such time the same persons re-assemble to disconnect the padlocks.

In the event that access is to be restricted by more than six padlocks, this can be achieved by the use of a second device which is engaged through one of the openings 42 rather than in the staple. Consequently, five padlocks can be attached to the first device and a further six padlocks to the second device. This of course can be extended at will provided that sufficient devices are available.

The device is preferably moulded of NYLON (a Trade Mark of E. I. Du Pont) in two parts, the bail being integral with the core element.

Figure 3:
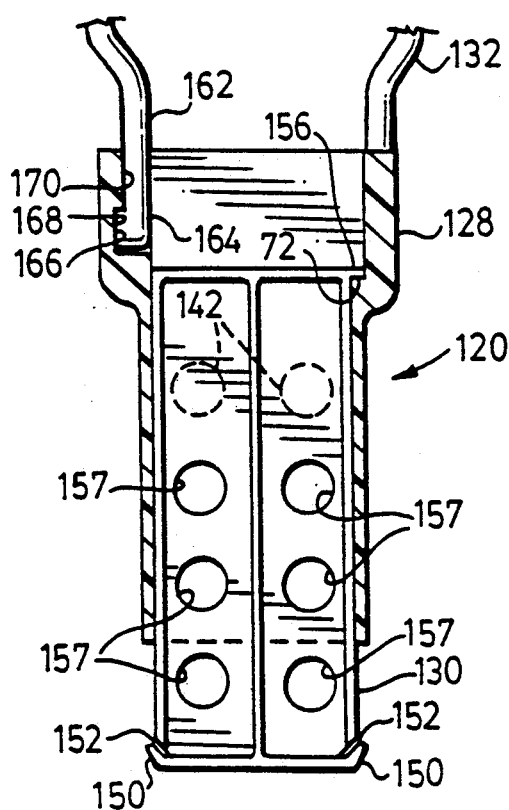
FIG. 3 is a view similar to FIG. 2 and showing an alternative embodiment of the invention.

Reference is now made to FIG. 3 which illustrates a second embodiment of device, designated generally by the numeral 120. Parts corresponding to those already described with reference to FIG. 1 and 2 will be given in the same reference numeral raised by 100 for ease of comparison.

As seen in FIG. 3, a sleeve element 128 receives a core element 130 and in this case a bail 132 is attached at a first end to the sleeve element 128. The second end of the bail has an enlargement 162 designed to fit in a recess 166 which has an inner portion 168 and neck portion 170 to receive the enlargement 162 and a shaft part of the bail in the neck portion.

The device 120 is shown in the release position where the bail can be removed by deflecting the enlargement 162 inwardly and then deforming the bail to withdraw the second end and allowing it to take up a position such as that shown for bail 32 in FIG. 2. To lock the device in the engagement position, the core element 130 and sleeve element 128 are moved longitudinally relative to one another from the FIG. 3 position to bring barbs 150 into engagement with the sleeve element 128 so that the core element then covers the recess 166 and the bail is locked in place. Locking is completed by adding padlocks.

In the FIG. 3 embodiment, the sleeve element is shaped internally to receive a lip 156 on one side of the core element 130 and a shoulder 72 is provided to act as a stop to locate the core element in the release position.

Further variations in the design of the device are contemplated within the scope of the invention as claimed.

We claim:

1. A device for use in restricting access by attaching the device to a staple associated with a hasp and locking the device by use of padlocks, the device comprising:
   a sleeve element;
   a core element positioned inside the sleeve element and movable by reciprocal linear movement between a release position and an engagement position;
   bail means having first and second ends and attached at the first end to one of the sleeve and core elements;
   said one of the sleeve element and the core element being adapted to locate said second end with the device in the release position and being operable by relative movement of the sleeve and core elements into the engagement position to lock the bail to the staple;
   both the sleeve element and the core element further defining openings such that openings in the sleeve element and openings in the core element are aligned with one another when the device is in the engagement position for receiving the padlocks; and
   at least one barb on the core element adapted to be deflected on assembly of the core element in the sleeve element to prevent separation of these elements.

2. A device for use with multiple individual locks and a staple associated with a hasp for restricting access, the device comprising:
   a sleeve element defining a plurality of through openings;
   a core element positioned inside the sleeve element and slidable linearly inside the sleeve element between release and engagement positions, the core element having a plurality of openings for registration with corresponding said through openings when the core element is in the engagement position to receive padlocks, one through each of the opening and corresponding through openings;
   a bail attached at one end of the core element for engagement in the staple, the bail having a second end and the core element and the bail being interengageable to releasably locate said second end with reference to the core element with the core element in the release position, whereby upon interengaging the core element and the bail the core element and sleeve can be moved relatively into the engagement position so that the second end of the bail is trapped by the core element in combination with the sleeve element and the device can then be retained in the engagement position on the staple by placing at least one of said padlocks through said openings and corresponding through openings to prevent movement of the sleeve and core elements into the release position; and
   a pair of barbs at an end of the core element remote from the bail, the barbs being adapted to deflect on assembly of the sleeve and core elements and to prevent separation of these elements.

3. A device for use with multiple individual locks and a staple associated with a hasp for restricting access, the device comprising:
   a sleeve element defining a plurality of through openings;
   a core element positioned inside the sleeve element and slidable linearly inside the sleeve element between release and engagement positions, the core element having a plurality of openings for registration with corresponding said through openings when the core element is in the engagement position to receive padlocks, one through each of the openings and corresponding through openings; and a bail attached at one end of the sleeve element for engagement in the staple, the bail having a second end and the sleeve element and the bail being interengageable to releasably locate said second end with reference to the sleeve element with the sleeve element in the release position, whereby upon interengaging the sleeve element and the bail, the core element and sleeve element can be moved relatively into the engagement position so that the second end of the bail is trapped by the core element in combination with the sleeve element and the device can then be retained in the engagement position on the staple by placing at least one of said padlocks through said openings and corresponding through openings to prevent movement of the sleeve and core elements into the release position.

* * * * *